United States Patent [19]
van der Meer et al.

[11] Patent Number: 5,254,242
[45] Date of Patent: Oct. 19, 1993

[54] FILTRATION UNIT HAVING MEANS FOR PREVENTING REUSE OF FILTER

[75] Inventors: Sijtze van der Meer, Hastings, Great Britain; Klaus Melgaard, Hove, England

[73] Assignee: U.S. Philips Corporation, New York, N.Y.

[21] Appl. No.: 825,697

[22] Filed: Jan. 27, 1992

[30] Foreign Application Priority Data

Jan. 28, 1991 [GB] United Kingdom ............... 9101772

[51] Int. Cl.⁵ ............................................. B01D 27/10
[52] U.S. Cl. ................................... 210/91; 210/232; 210/282; 210/455; 210/473
[58] Field of Search ............... 210/91, 100, 232–234, 210/238, 282, 416.3, 448, 258, 257.1, 416.1, 473, 477, 455

[56] References Cited

U.S. PATENT DOCUMENTS

| | | | |
|---|---|---|---|
| 3,539,009 | 11/1970 | Kudlaty | 210/257.1 |
| 3,700,112 | 10/1972 | Maeshiba | 210/448 |
| 3,746,171 | 7/1973 | Thomsen | 210/234 |
| 3,950,253 | 4/1976 | Stern | 210/416.3 |
| 4,608,166 | 8/1986 | Cain | 210/232 |
| 4,678,572 | 7/1987 | Hehl | 210/232 |
| 4,772,386 | 9/1988 | Grout et al. | 210/282 |
| 4,857,189 | 8/1989 | Thomsen et al. | 210/238 |
| 5,133,858 | 7/1992 | Walz et al. | 210/448 |

*Primary Examiner*—Joseph W. Drodge
*Attorney, Agent, or Firm*—Leroy Eason

[57] ABSTRACT

A water cleaning device (1) is provided which has a housing (10) arranged to be supported by a surface, for example stood upon a work surface (50). The housing (10) defines a receptacle (2) for water (100) to be cleaned. A water filtration unit (20) is mounted to the housing (10) and has an outlet (21) for filtered water (101). An electrically operated pump (30) and control means (16,17,25,26,27,28,40) for controlling the pump (30) are provided within the housing (1) for pumping water through the filtration unit (20) to provide cleaned filtered water (101) at the outlet (21). The filtration unit (20) carries a collar (29) which, when the filtration unit (20) is removed from its mounting support (12), is fixed in position relative to the filtration unit (20) so that the filtration unit (20) cannot be mounted to the mounting support (12) again after the filtration unit (20) has once been removed from the housing. This prevents accidental re-use of an old filtration unit which is clogged or otherwise not fully operational.

15 Claims, 2 Drawing Sheets

, 1

FILTRATION UNIT HAVING MEANS FOR PREVENTING REUSE OF FILTER

FIELD OF THE INVENTION

This invention relates to a water cleaning device.

BACKGROUND OF THE INVENTION

A water cleaning device is known which comprises a housing arranged to be supported on a surface, the housing defining a receptacle for water to be cleaned and a water filtration unit removably mounted to a mounting support provided by the housing and an electrically operated pump and control means for controlling the pump provided within the housing for pumping water through the filtration unit to provide cleaned filtered water at an outlet of the water filtration unit.

U.S. Pat. No. 3,950,253 describes such a water cleaning device in which the filtration unit is mounted within the water receptacle mainly by means of a fluid-tight seal between a nipple connected to the pump outlet and mounted in the base of the receptacle and an inlet bore of the filtration unit. An O-ring seal is provided between the nipple and the inlet bore to ensure a water-tight seal. The filtration unit is inserted into the housing through an opening at the upper part of the housing. The opening may define a frame giving positional support to the filtration unit. The filtration unit may be provided with wing members intended to align with corresponding edges of the frame to enable the filtration unit to be correctly located within the receptacle.

Although the device described in U.S. Pat. No. 3,950,253 may enable a filtration unit to be correctly located, the device cannot identify whether or not a filtration unit which has just been inserted is a new unused filtration unit and accordingly it is possible for a user of the device accidentally to insert an old used filtration unit into the device.

As the user would be unaware that an old used filtration unit which has become clogged or is otherwise no longer fully operational had been inserted into the device, the user may then proceed to operate the device with the used filtration unit and the device would then no longer provide good quality filtered water.

SUMMARY OF THE INVENTION

Accordingly, in one aspect, the present invention provides a water cleaning device comprising a housing arranged to be supported by a surface, the housing defining a receptacle for water to be cleaned, a water filtration unit removably mounted to a mounting support provided by the housing and an electrically operated pump and control means for controlling the pump provided within the housing for pumping water through the filtration unit to provide cleaned filtered water at an outlet of the water filtration unit, wherein the filtration unit carries a collar which, when the filtration unit is removed from the mounting support, is fixed in position relative to the filtration unit so that the filtration unit cannot be mounted to the mounting support provided by the housing again after the filtration unit has once been removed from the housing.

The present invention also provides a filtration unit for use in a water cleaning device having a housing for accommodating the filtration unit and defining a receptacle for water to be cleaned by the filtration unit, the filtration unit having a part for forming a releasable locking mechanism with a mounting support provided by the housing and carrying a movable collar which is movable, when the releasable locking mechanism is released from a first position to a second position in which the collar is fixed in position relative to the filtration unit, so that, after removal of the filtration unit from the housing, the fixed second position of the collar prevents the filtration unit from being again locked into the housing.

Such an arrangement means that once a filtration unit has been removed from the device it cannot be returned. This prevents a filtration unit which has become clogged or is otherwise no longer fully operative from being re-used. The fact that a filtration unit is no longer fully operative may be determined by monitoring the flow rate of water through the filtration unit and providing a signal to the user when the flow rate drops below a certain level and/or by monitoring the total amount of water which has passed through the filtration unit and providing a signal to the user when the total amount of water which has passed through the filtration unit exceeds a predetermined limit.

The collar may have an inner cam surface cooperating with a cam surface provided on the filtration unit for adopting a first position relative to the filtration unit cam surface when the of the filtration unit is mounted to the mounting support and for adopting, when the filtration unit is removed from the mounting support, a second position relative to the filtration unit cam surface in which the collar is fixed onto the filtration unit.

The collar may be connected to the filtration unit via a breakable seal when the inner cam surface is in the first position relative to the filtration unit to reduce the possibility of the collar inadvertently being moved to the fixed second position by the user.

The collar may have an outer cam surface cooperating with a stop provided by the housing for causing the collar to move from the first position to the second locked position relative to the filtration unit cam surface when the filtration unit is removed from the mounting support. The stop may be associated with a sensor for indicating the presence of the filtration unit. Such a sensor may be in the form of a reset switch, the condition of which is sensed by the control unit to determine when the filtration unit has been changed so as to inhibit further operation of the device until a filtration unit which is no longer fully functional has been replaced by a new filtration unit. Such a sensor may also be used to control activation of the pump thereby preventing the device from being operated unless the filtration unit is correctly locked into the housing.

Part of the filtration unit may form a bayonet-type releasable locking mechanism with a mounting support.

The outlet of the filtration unit may be provided with a nozzle for directing cleaned water into a collection jug.

BRIEF DESCRIPTION OF THE DRAWINGS

Embodiments of the invention will now be described, by way of example, with reference to the accompanying drawings, in which.

It should of course be understood that the Figures are merely schematic and are not to scale.

DETAILED DESCRIPTION OF PREFERRED EMBODIMENTS

Figure 1:
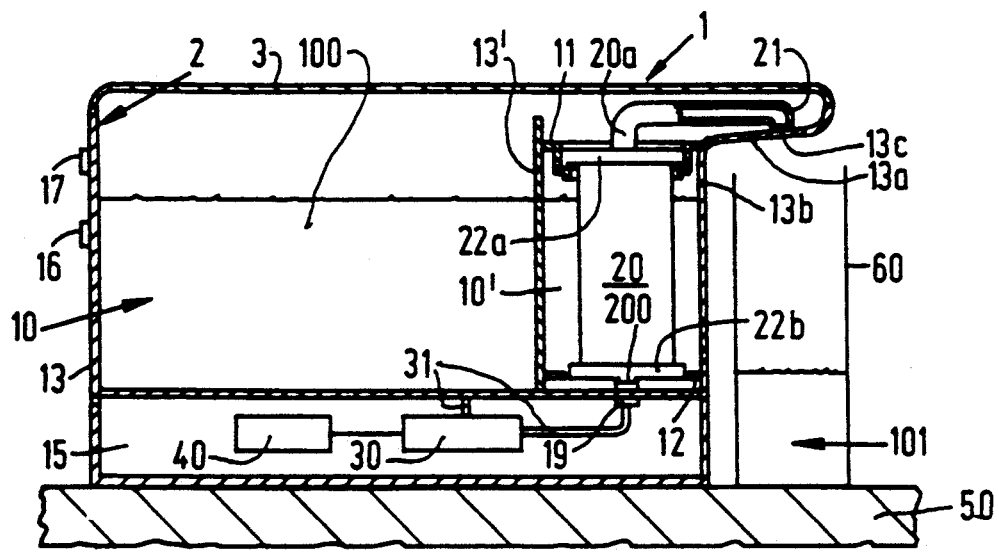
FIG. 1 is a part-sectional side view of a domestic water cleaning device in accordance with the invention.

Referring now to the drawings, especially FIG. 1, there is illustrated a water cleaning device 1 comprising a housing 10 arranged to be supported on a surface, as shown in FIG. 1 to be stood upon a work surface 50, the housing 10 defining a receptacle 2 for water 100 to be cleaned, and a water filtration unit 20 mounted to the housing 10 and having an outlet 21 for filtered water. An electrically operated pump 30 and control means 16,17,25,26,27,28,40 for controlling the pump 30 are provided within the housing 1 for pumping water through the filtration unit 20 to provide cleaned filtered water 101 at the outlet 21.

The water cleaning device 1 shown in FIG. 1 may be located on any suitable work surface, for example a kitchen work top or table of a private house, flat or a small guest house. The device 1 need not, however, be kept at a fixed location but may be moved to different locations and, for example, may be taken on holiday with the owner to ensure a cleaned water supply. This may be particularly advantageous in certain countries where the local water supply is not sufficiently clean to be drunk without boiling. In addition, the electrically operated pump 30 allows the water to be pumped through the filtration unit 20 to enable cleaned filtered water to be provided far more quickly than can be the case with a gravity fed device.

Referring now specifically to the embodiment shown in FIG. 1, the housing 10 has walls 13 defining the receptacle 2 for water 100 to be cleaned. In this example, the filtration unit 20 is located within a compartment 10' of the housing 10 separate from the receptacle 2. The compartment 10' may be formed by means of a partitioning wall 13' separating it from the receptacle 2 or may completely separate from the receptacle. The filtration unit 20 could, however, be mounted to the outside of the housing by means of, for example, brackets or may be mounted actually within the receptacle 2. The wall 13' carries a mounting support 11 which, as will be described in greater detail below with respect to FIGS. 2 and 3a to 3e, forms a releasable locking mechanism with part 22a of the filtration unit 20.

The filtration unit 20 is provided with a nozzle or outlet part providing the outlet 21 for cleaned filtered water. The nozzle 21 may be integrally formed with the filtration unit or may be a separate component or even part of the housing. In this example, the nozzle 21 is accommodated in a recess formed by a lateral extension 13a of a lower portion 13b of the housing wall 13. The nozzle 21 is positioned over an aperture 13c in the lateral extension 13a to allow cleaned water 101 to be pumped out of the filtration unit 20 and into a collection jug 60. As illustrated in FIG. 1, the lateral extension 13a of the housing wall 13 slopes downwardly back towards the receptacle 2 from the aperture 13c. This enables any water which may spill or leak from the filtration unit 20 when the pump 30 is switched off to flow down the lateral extension 13a and back into the receptacle 2.

In the example shown in FIG. 1, the housing 10 includes a chamber 15 beneath the receptacle 2 in which are accommodated the electrical pump 30 and a control the control means. The pump 30 is arranged to pump water through a supply pipe 31 from an out-let (not shown) of the receptacle 2 to an inlet 200 of the filtration unit 20. The inlet 200 and supply pipe 31 are connected Via suitable sealing means 19, such as an O-ring seal, via an aperture (not shown) in the housing wall. It may be possible for the pump 30 and control means to be mounted, possibly in a separate compartment, above the filtration unit 20 so that the filtration unit inlet 200 and outlet 20a are both at the top end 22a so as to avoid any possibility of water leaking into the control means.

In FIG. 1, the container or jug 60 for the cleaned water 101 is simply stood upon the work surface 50. However, the housing 10 may be provided with an extension upon which the jug 60 may be stood. Thus, for example, the chamber 15 may be in the form of a plinth extending beyond the housing wall 13 to provide a platform for the jug 60.

Although in the arrangement shown in FIG. 1, the housing is supported on a work surface, such as for example any convenient table or cupboard top surface, the housing 10 may be supported by a vertical surface or wall by means of a bracket arrangement. Such an arrangement would be particularly advantageous in a small kitchen where work space is limited. Where the housing 10 is supported on the wall, the housing 10 may, as described above, be provided with an extension to support the jug 60 or alternatively the bracket arrangement may provide a surface for supporting the jug 60.

The filtration unit 20 may, for example, comprise an activated charcoal (carbon) filter for removing contaminants such as heavy metal (e.g. lead), chlorine, etc. and, in series with the charcoal filter, a bacteriological membrane filter for removing particulate matter and bacteria of a size greater than about 0.45 $\mu$m, it having been found that water-borne bacteria smaller than 0.45 $\mu$m tend not to cause illness in human beings. A suitable combination of such filters is available commercially from Pall Filter Corporation of New York, USA. Of course, other commercially available suitable types of filters could be used and the charcoal or the bacteriological filter could both be used on their own.

Although not shown in FIG. 1, the pump 30 and control means are powered by a mains electrical supply via, if necessary, an appropriate conventional transformer.

Figure 1A:
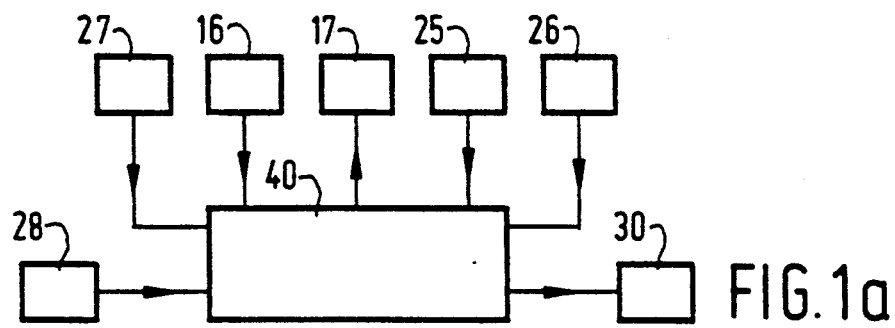
FIG. 1a is a simplified block diagram of control means of the device shown in FIG. 1.

As illustrated in a very simplified manner in FIG. 1a, the control unit 40 is arranged to control operation of the pump 30 in response to various input signals. Thus, for example, the control unit 40 may switch the pump 30 on or off depending upon the condition of an ON-OFF switch 16 provided on the housing 10. A sensor 27 could be provided within the receptacle 2 to prevent operation of the pump 30 until the receptacle 2 has been filled with the water to be cleaned. A further sensor 28 is preferably provided, as will be described below, to prevent operation of the pump 30 unless a functional filtration unit 20 is present in the housing.

A flowmeter 25 of a conventional type may be provided in the tube 31 at the inlet 200 of the filtration unit 20 to provide to the control unit 40 a signal indicating the rate of flow through the filtration unit. In addition, the control unit 40 may be provided with calculating means 26 of known type for calculating the total flow of water through the filtration unit 20. The flowmeter 25 may be provided between the filtration unit 20 and the pump 30 or between the receptacle 2 and the pump 30. The latter position may be more suitable for detecting dry running (that is when the receptacle 2 is empty) while the former may be better from a measurement point of view because the pressure should be higher. The flowmeter may comprise a paddle wheel with optical or magnetic means for detecting rotation of the paddle wheel. Of course, any suitable type of flowmeter could be used. For example a pressure-operated flowmeter could be used.

In this embodiment, where the filtration unit 20 comprises a charcoal filter and a bacteriological filter, the control unit 40 may be arranged to provide an indication, for example via a warning light 17 on the housing 10, that the filtration unit 20 should be changed when a predetermined maximum total volume of water of, for example, about 400 liters has flowed through the filtration, it 20 (the receptacle 2 and jug 60 may each have a capacity of 2 liters which indicates the maximum safe usable life of the charcoal filter and/or when the flow rate falls below a predetermined minimum, for example 0.5 liters per minute, which indicates that the bacteriological filter is unacceptably clogged and needs changing. The control unit 40 may provide an indication that the device is running without water, for example when the receptacle 2 has emptied or the user has forgotten to fill the receptacle 2, if the flow rate falls to between, for example, 0 and 0.2 liters per minute. The control unit 40 may be arranged to prevent operation of the device 1 until such time as the filtration unit 20 has been changed once the maximum total flow volume is exceeded or the flow rate drops below the permitted minimum. Generally, the control unit 40 will be a microprocessor control unit.

As mentioned above, a part, in this example an end 22a, of the filtration unit 20 cooperates with a mounting support 11 carried by the wall 13 of the compartment 10' to provide a releasable locking mechanism for locking the filtration unit 20 in place within the housing 2.

Figure 2:
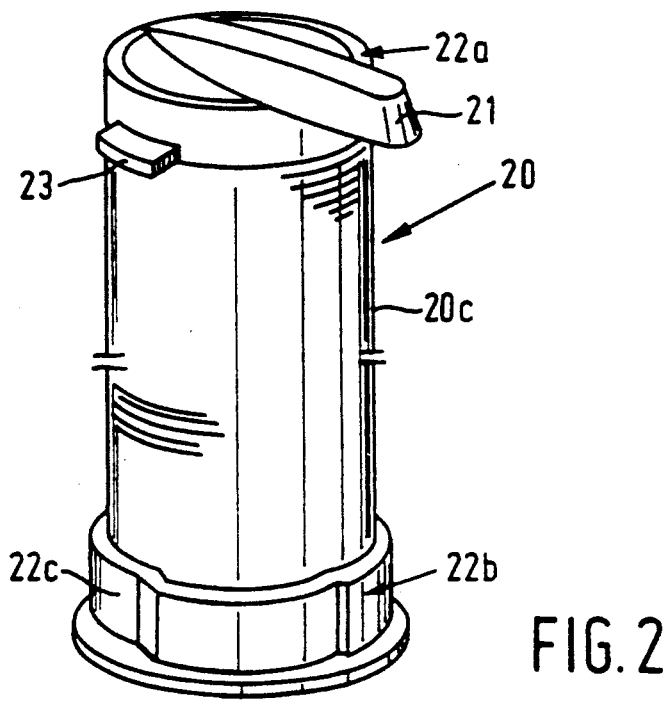
FIG. 2 is a perspective view of a filtration unit in accordance with the invention for use in the water cleaning device shown in FIG. 1.
Figure 3:
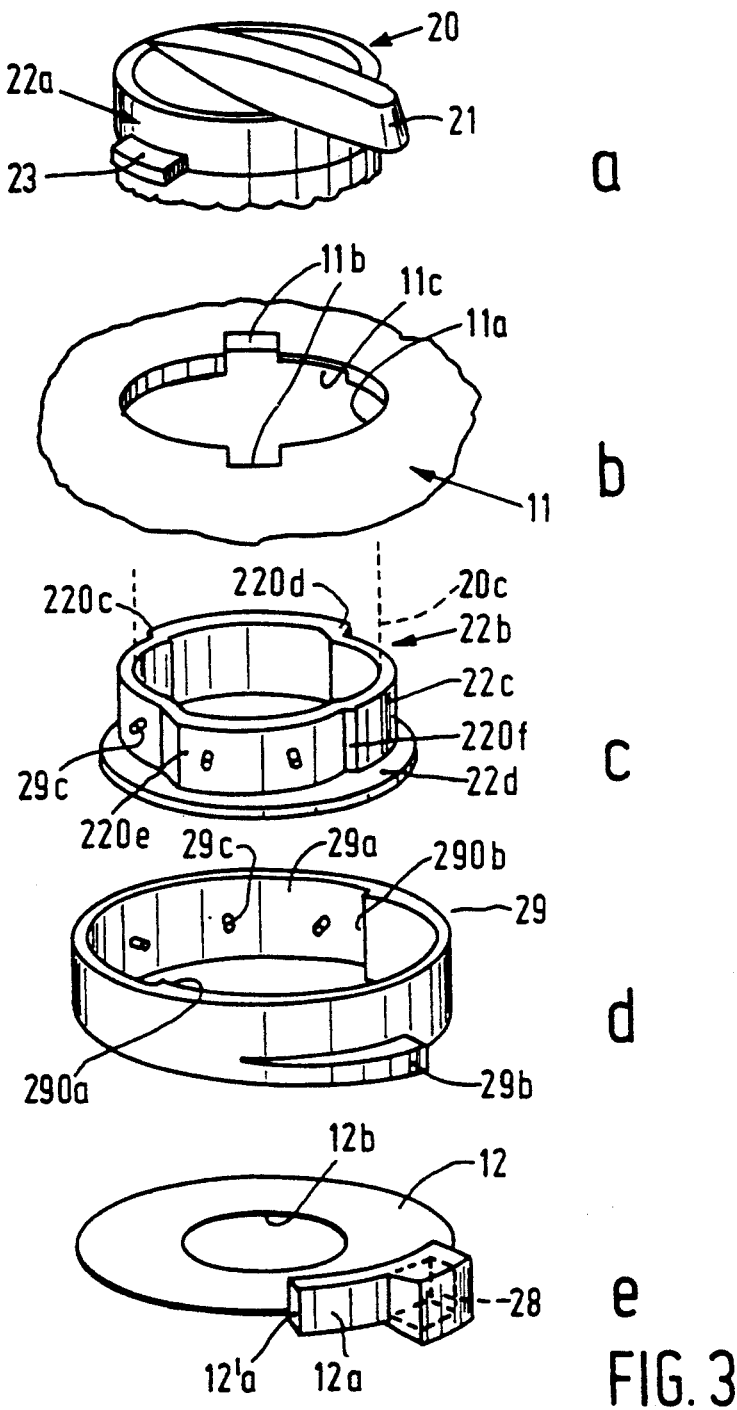
FIGS. 3a to 3e are perspective views of component parts of the filtration unit shown in FIG. 2 and supports provided by the housing of the water cleaning device shown in FIG. 1 for illustrating the manner in which the filtration unit is locked into the housing.

As illustrated by FIGS. 2, 3a and 3b, the releasable locking mechanism is in the form of a bayonet-type locking mechanism. Thus, the end 22a of the filtration unit 20 has two projection lugs 23 (only one of which is shown) which are diametrically opposed in the embodiment shown in FIGS. 2 and 3a where the filtration unit 20 has a generally cylindrical body 20c and is of circular cross-section. As illustrated in FIG. 3b, the mounting support 11 is provided with a generally circular aperture 11a for receiving the filtration unit 20 and has two corresponding diametrically opposed recesses 11b shaped to receive the lugs 23. Each of the recesses 11b communicates with a guide groove 11c formed in the underside of the mounting surface 11 so that once the lugs 23 have been inserted into the recesses 11b the filtration unit 20 can be rotated about its longitudinal axis to enable the lugs 23 to move into and follow the grooves 11c to lock the end 22a of the filtration unit 20 to the mounting support 11.

Figure 4:
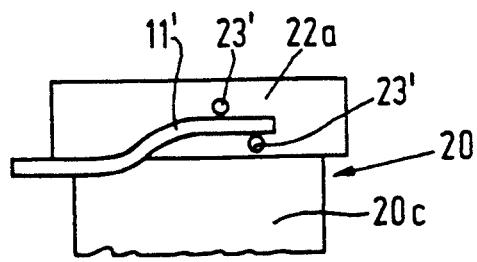
FIG. 4 illustrates part of a filtration unit and mounting support to show a modified form of releasable locking mechanism.

FIG. 4 illustrates a modified form of a bayonnet-type of releasable locking mechanism for the filtration unit 20. In this example, the mounting support is in the form of a split ring providing two cam or contoured guide rails 11' and the end of the filtration unit 20 carries two pairs of pins or projections 23' only one guide rod and one pair of pins being shown in FIG. 4. Each pair of pins 23' is arranged to receive therebetween a respective one of the guide rails 11'. The contouring of the guide rails 11' causes the filtration unit 20 to be pushed downwardly as it is rotated to lock the releasable locking mechanism. This downward movement of the filtration unit 20 should ensure a good water-tight seal to the supply pipe 31.

FIG. 3c illustrates the other end 22b of the filtration unit 20 with the cylindrical body 20c removed and its location shown in phantom lines.

The other end 22b of the filtration unit 20 has an outer cam surface 22c which cooperates with an inner cam surface 29a of a collar 29 shown in FIG. 3d. The collar 29 has an outer cam surface 29b which cooperates with a cam stop 12a provided, in this example, on a mounting support, in this case a support plate 12 which, in this embodiment is mounted to the compartment 10' of the housing 13 (see FIG. 1). The support plate 12 is generally circular and has a central aperture 12b for receiving the inlet 200 of the filtration unit to allow the filtration unit 20 to be connected to the supply pipe 31. The cam stop 12a incorporates the further sensor 28, for example a microswitch, for providing a reset signal to the control unit 40 indicating whether or not the filtration unit 20 has been changed. The sensor could also indicate that the filtration unit 20 is correctly locked in place by the releasable locking mechanism. The cam stop 12a may, of course, be provided directly on a wall of the compartment 10'. Although the housing compartment 10' may have any desired shape, for example rectangular, oval etc., the compartment 10' may be shaped so that its wall 13' surrounds and thus conforms to a substantial proportion of the peripheries of the mounting support 11 and support plate 12. Of course, the mounting support 11 and support plate 12 could be integrally formed with the compartment 10'.

Although in the embodiment described above the mounting support 11 and support plate 12 are provided at respective ends of the filtration unit 20, it will of course be appreciated that these components and thus the releasable locking mechanism and collar 29 may be provided at any appropriate position on the filtration unit 20.

Before the filtration unit 20 is locked into the housing by the releasable locking mechanism, the collar 29 surrounds the cylindrical body 20c and is supported by a flange 22d of the end 22b of the filtration unit 20 so that first projection 290a of the inner cam surface 29a of the collar 29 is adjacent a cam surface region 220e of the end 22b of the filtration unit 20 while a second projection 290b of the inner cam surface 29a is adjacent a projection 220d of the end 22b of the filtration unit 20. In this first position, the collar 29 may be connected to the end 22b of the filtration unit 20 by a frangible (breakable) seal which inhibits inadvertent relative movement between the collar 29 and the filtration unit 20. The breakable seal may be formed by any suitable means, for example a relatively weak web of material or, as in the embodiment shown in FIGS. 3c and 3d, a series of pins 29c extending radially from the cam surface 22c to the inner cam surface 29a of the collar 29. It will be appreciated that by virtue of the exploded view of FIGS. 3a to 3c, the pins 29c are shown as separated into two portions although of course with the relative orientations of the collar 29 and cam surface 22c shown in FIGS. 3c and 3d the pins 29c will not in practice be broken.

In order to insert the filtration unit 20 into the housing 10, the lid 3 is removed or pivoted to expose the interior of the housing 10. The filtration unit 20 is placed into the compartment 10' so that the lugs 23 are inserted into the recesses 11b (or the pins 23' engage the guide rails 11') and the body 20c of the filtration unit 20 is rotated (in a clockwise direction when viewed looking down upon the end 22a of the filtration unit 20) so that the lugs 23 follow the grooves 11c (or the pins 23' following the guide rails 11').

As the filtration unit 20 is rotated with the lugs 23 following the grooves 11c (or the pins 23' following the guide rails 11'), the collar 29 and filtration unit 20 are rotated as one body until the cam surface 29b passes the cam stop 12a and, by virtue of an in-built resilience of the cam surface, engages behind an end surface 12'a of the cam stop 12a. By this point, the cam surface 29b will have activated the reset switch 28 to provide a signal to the control unit 40 indicating that the filtration unit 20 has been changed.

The reset switch 28 should be able to detect the insertion of a new filtration unit 20 and provide a reset signal to the control unit 40 regardless of whether the device is connected to an electricity supply. For this purpose, the control unit 40 may be provided with a battery back-up. More simply, the reset switch 28 may be a mechanical two position switch and the control unit 40 may be arranged to detect, for example by means of an optical arrangement, if the position of the reset switch 28 has changed since the last time the device was operated. This latter arrangement should allow the filtration unit 20 to be changed while the control unit is switched off.

The receptacle 2 can be filled with water, generally about 2 liters, either before or after insertion of the filtration unit 20. When the receptacle 2 has been filled and a filtration unit 20 is in place, the lid 3 is returned to its closed position. It should be ensured at this stage that the collection jug 60 is positioned beneath the nozzle 21. An indication switch (not shown) may be provided to detect the jug 60.

Assuming that a mains supply lead (not shown) of the device 1 has been connected to an appropriate mains electrical supply, then movement of the ON-OFF switch 16 to the on position causes the control unit 40 to start the pump 30 to cause the water 100 in the receptacle 2 to be pumped through the supply pipe 31 and up through the filtration unit 20 so that the nozzle outlet 21 supplies cleaned filtered water 101 into the jug 60. The flowmeter 25 will provide an indication to the control unit 40 that the receptacle 2 is empty when the flow rate drops below, for example, 0.2 liters per minute. Alternatively, the sensor 27, if provided, may be used to advise the control unit 40 that the receptacle 2 is empty. The control unit 40 then stops operation of the pump 30.

The above opertion can be repeated until the filtration unit 20 stops functioning correctly. This may occur when, for example, the charcoal filter is no longer sufficiently active to remove contaminants, typically when a total volume of about 400 liters has passed through the filtration unit 20 or when the bacteriological filter becomes so clogged that the flow rate is less, for example, than 0.5 liters per minute. In this situation, the total volume calculating unit 26 or the flowmeter 25, respectively, will provide a signal to the control unit 40 which will act to cause the warning light 17 to be lit. Once the water 100 then present in the receptacle 2 has been filtered, the control unit 40 will prevent the pump 30 from operating again until the filtration unit 20 has been replaced by a fresh one.

The warning light 17 may be replaced by a panel of lights giving a progressive indication of the status of the filtration unit by indicating for example, when 20%, 40%, 60%, 80%, 90% and 100% of the predetermined maximum total amount of water has passed through the filtration unit 20. This will provide an early warning to the user when the filtration unit 20 is approaching the end of its useful life. In addition an audible warning may be provided in the form of a buzzer or bell to indicate when the filtration unit 20 is no longer capable of functioning correctly.

The used filtration unit 20 is removed by, having moved the lid 3 out of the way, rotating the body 20c in the anti-clockwise direction looking down upon end 22a of the filtration unit 20 until the lugs 23 can pass through the recesses 11b (or the pins 23' disengage from the guide rails 11').

The cam surface 29b is, as mentioned above, positioned so as to abut the end face 12'a of the cam stop 12a. Accordingly, the cam stop 12a prevents the collar 29 from rotating in the counterclockwise direction when the body 20 is so rotated. The force applied by the user to rotate the filtration unit 20 in the counterclockwise direction causes the breakable seal (if present) between the collar and the filtration unit 20 to break to allow the filtration unit 20 to rotate about its longitudinal axis and relative to the collar 29.

By the stage at which the lugs 23 have again become aligned with the recesses 11b (or the pins 23' disengage from the guide rails 11') to enable the filtration unit 20 to be removed from the compartment 10', the cam surface 22c will have been rotated relative to the inner cam surface 29a of the collar 29 so that the collar is fixed in the second position with the cam projections 290a and 290b of the inner surface surface 29a of the collar 29 abutting the cam projections 220c and 250f, respectively, of the cam surface 22c. The fact that the cam projection 290a abuts the cam projection 220c will prevent rotation of the collar 29 in a clockwise (viewed looking down on the end 22a of the ion unit 20) direction with respect to the cam surface 22c while the fact that the cam projection 290b abuts the cam projection 220f will prevent rotation of the collar 29 with respect to the cam surface 22c in the opposite or counterclockwise direction. Accordingly, the collar 29 is now permanently fixed in the second position relative to the cam surface 22c.

As will be appreciated from the above, if the used filtration unit 20 with the collar 29 in the fixed second position is re-inserted into the housing, when the lugs 23 are aligned with the recesses 11b (or the pins 23' are aligned to the gaps in the split ring forming the guide rails 11'), the cam surface 29b will abut the end face 12'a and rotation of the filtration unit 20 to lock the releasable locking mechanism will move the cam surface 29b away from the sensor 28. It is thus not possible for the cam surface 29b to activate the reset switch when the collar 29 is locked in the second fixed position. Accordingly, the control unit 40 will not receive a signal indicating that the filtration unit 20 has been changed and operation of the pump 30 will be inhibited until a fresh filtration unit 20 (with its collar 29 in the first position) is inserted into the housing 10 which can activate the reset switch 28.

The cam surfaces 22c, 29a and 29b may have any suitable shape to achieve the desired function. In particular, the cam projection 29b and cam stop 12a may project axially rather than radially of the filtration unit.

This relatively simple cam surface arrangement thus prevents an operator, deliberately or inadvertently, trying to reuse an old used filtration unit 20 which will no longer function correctly to remove impurities and contaminants from the water pumped through it. The fact that the collar 29 is fixed in the second position relative to the body 20c also provides an easy visual (or tactile) indication that the filtration unit 20 has previously been used and is no longer capable of functioning correctly.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention.

We claim:

1. A water cleaning device comprising a housing arranged to be supported by a surface, the housing defining a receptacle for water to be cleaned, a water filtration unit removably mounted to a mounting support provided by the housing and an electrically operated pump and control means for controlling the pump provided within the housing for pumping water through the filtration unit to provide cleaned filtered water at an outlet of the water filtration unit, wherein the filtration unit carries a collar designed such that when the filtration unit is removed from the mounting support it is fixed in position relative to the filtration unit and such that the filtration unit cannot be mounted to the mounting support provided by the housing again after the filtration unit has once been removed from the housing.

2. A device according to claim 1, wherein the collar has an inner cam surface cooperating with a cam surface provided on the filtration unit for adopting a first position relative to the filtration unit cam surface when the filtration unit is mounted to the mounting support and for adopting, when the filtration unit is removed from the mounting support, a second position relative to the filtration unit cam surface in which the collar is fixed in position relative to the filtration unit.

3. A device according to claim 2, wherein the collar is connected to the filtration unit via a breakable seal when the inner cam surface is in the first position relative to the filtration unit.

4. A device according to claim 2 or 3, wherein the collar has an outer cam surface cooperating with a stop provided by the housing for causing the collar to move from the first position to the second fixed position relative to the filtration unit cam surface when the filtration unit is removed from the mounting support.

5. A device according to claim 4, wherein the stop is associated with a sensor for indicating the presence of the filtration unit.

6. A device according to claim 5 wherein a part of the filtration unit forms a bayonet-type releasable locking mechanism with the mounting support provided by the housing.

7. A device according to claim 4 wherein a part of the filtration unit forms a bayonet-type releasable locking mechanism with the mounting support provided by the housing.

8. A device according to claim 3 wherein the collar has an outer cam surface cooperating with a stop provided by the housing for causing the collar to move from the first position to the second fixed position relative to the filtration unit cam surface when the filtration unit is removed from the mounting support.

9. A device according to claim 3 wherein a part of the filtration unit forms a bayonet-type releasable locking mechanism with the mounting support provided by the housing.

10. A device according to claim 2 wherein a part of the filtration unit forms a bayonet-type releasable locking mechanism with the mounting support provided by the housing.

11. A device according to claim 1 wherein a part of the filtration unit forms a bayonet-type releasable locking mechanism with the mounting support provided by the housing.

12. A filtration unit constructed and arranged for use in a water cleaning device having a housing which defines a receptacle for water to be cleaned by the filtration unit, the housing having a mounting support for releasably engaging the filtration unit; said filtration unit comprising:

a generally cylindrical filter body having an interlock element thereon designed for releasably engaging said mounting support such that engagement, therewith and release therefrom is by partial axial rotation of said body in forward and reverse rotational directions, respectively;

a collar element around a cammed surface portion of said body, said collar element having a cammed inner surface which mates with and is releasably coupled to a cammed surface portion of said filter body when said collar element is in a first position with respect to said filter body, such that when in said first position the collar element axially rotates with the filter body when the latter is axially rotated in the forward direction to engage said mounting support; and means for preventing said collar element from rotating with said filter body when the latter is rotated in the reverse direction to effect release thereof from said mounting support, so that upon said filter body from the mounting support said collar element is repositioned in a second position with respect to said filter body wherein the cammed surface of said collar element locks to the cammed surface portion of said filter body;

whereby once said filter body has engaged with and been released from said mounting support said collar element is locked in said second position and cannot again return to said first position, effectively preventing reuse of said filtration unit.

13. A filtration unit according to claim 12, wherein the collar element is coupled to the filter body via a breakable seal when the collar element is in the first position relative to the filter body.

14. A filtration unit according to claim 13 wherein said housing has a cam stop and said means for preventing rotation of said collar element in the reverse direction comprises an outer cam surface on said collar element which engages said cam stop when the filter body is axially rotated in the reverse direction to release from said mounting support.

15. A filtration unit according to claim 12 wherein said housing has a cam stop and said means for preventing rotation of said collar element in the reverse direction comprises an outer cam surface on said collar element which engages said cam stop when the filter body is axially rotated in the reverse direction to release from said mounting support.

* * * * *